Patented Nov. 22, 1932

1,888,595

UNITED STATES PATENT OFFICE

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO

BASE FOR PAINTS, VARNISHES, AND LACQUERS, AND METHOD OF MAKING THE SAME

No Drawing.   Application filed February 24, 1931. Serial No. 518,038.

This invention relates to a destructively distilled, mixed glyceride condensation product, and process of making the same, for use as a base for paint, varnish or lacquer.

The present invention relates to certain improvements in the product and process disclosed in my prior Patent No. 1,799,420, granted April 7, 1931, and has for its object a product that will be more water-resistant and possess a somewhat better gloss than the product resulting from the process disclosed in said patent.

A further object of the invention is to utilize the so-called drying oils in the manufacture of paint and varnish bases by a process that will avoid some of the objections to such oils. For example, when China-wood oil is heated to a temperature of about 260° C. it has a tendency to rapidly gelatinize and it requires great skill and very speedy action on the part of the operator to save the batch when this condition arises. A very rapid introduction of rosin or cold stand-oil to chill the batch below 200° C. may succeed in saving it from complete destruction but, if the operator fails to add the rosin or cold stand-oil quickly enough, the batch becomes a rubbery, vesiculated, insoluble, worthless mass and may even ignite and cause a disastrous conflagration.

Linseed oil and perilla oil may be heated to these high temperatures with much less risk yet care must always be taken that the critical temperature is not exceeded, since, if this happens, the reaction becomes exothermic, and very rapid decomposition ensues.

It is one of the objects of the present invention to provide a method of utilizing these drying oils that will obviate the above mentioned difficulties.

In my prior Patent No. 1,779,420, I have described and claimed a condensation product made from castor oil and other materials by a process of partial destructive distillation. I have discovered that a mixture of castor oil and the well-known drying oils, such as linseed, China-wood, and perilla oil, when subjected to partial destructive distillation, produces a base material which has some advantages over the product obtained by a partial destructive distillation of the castor oil alone, as described in my aforesaid patent.

When China-wood oil is substituted, in part, for castor oil, the final product made, when used in protective coating, is found to dry somewhat harder and will be more water-resistant than the product made from castor oil as disclosed in the patent. When linseed oil and perilla oil are used in partial substitution for the castor oil, the final products which are obtained have somewhat better drying properties than the product from castor oil alone and they also possess a somewhat better gloss, although the resistance to water is inferior to that of the product produced from a mixture of castor oil and China-wood oil.

In practicing the present invention, I may use 500 parts, by weight, of castor oil and 500 parts of any of the drying oils referred to above. These oils are mixed together and destructively distilled until the residue of polymeric esters is approximately 85 per cent of the original mixture. In this operation the castor oil, in the mixture, will lose about 26 per cent of its weight and the drying oil will lose from 3 to 5 per cent of its weight. The retort is then cooled to a temperature below 290° C. and 800 parts of glycerine are gradually introduced. The mixture is then heated for a short time at temperatures well above the boiling point of water but below the boiling point of glycerine, and then 1200 parts of phthalic anhydrid are gradually added, the temperature being maintained about mid-way between the boiling point of phthalic anhydrid and that of water. When the reaction has proceeded to the optimum degree, which is indicated by the first appearance of clarity and homogeneity in place of turbidity and heterogeneity, the mixture is run into cooling pans to cool or into mixing tanks to be thinned with the proper solvent mixtures which vary somewhat according to the use to which the product is to be put.

By varying the proportions of polymeric esters of undecylenic acid, glycerine and phthalic acid anhydride the physical properties of the resulting compounds are varied. While, in the example given, the distillation is stopped when the residue is approximately 85 per cent of the original mixture, this procedure may be varied so that the residue will be from 70 to 90 per cent of the original mixture, and the amount of glycerine that is added may vary from one-half to three times the weight of said residue. The amount of undecylenic esters that are added may vary from three-fourths to five times the weight of the material to which they are added. A lessening of undecylenic esters gives a harder product while an increase of undecylenic esters produces a softer compound.

Also by the use of other polyhydric alcohols and other polybasic acids along with the esters of undecylenic acid and its polymers products of harder or softer consistency may be obtained.

In the specific example given, the distillation of the mixture of castor oil and a drying oil is carried on until the distillate is about 15 per cent of the original mixture and the polymeric esters are about 85 per cent of the weight of the original mixture. I do not wish to limit myself to these proportions since the distillation may be carried much further and still yield a usable product. However, since there is a tendency for these undecylenic compounds to discolor as the distillation progresses, I usually prefer to stop the distillation within a range of 10 to 30 per cent of distillate, especially when the distillation is carried on at atmospheric pressures. There are some advantages in the use of reduced pressures during distillation especially if a light colored product is desired; and, under these conditions, I prefer to use some commercial form of vacuum pump with suitable condenser for the recovery of the valuable distillate.

In the specific example given, the order of procedure is to esterify with glycerine before condensing with phthalic anhydride. This is the preferable method but I do not wish to limit myself to this order of procedure since by the exercise of care it is possible to obtain a usable product if the phthalic acid anhydride is added before the glycerine or simultaneously with the glycerine.

As above stated, I prefer to use, as the base material, a mixture of castor oil with linseed oil, China-wood oil, or perilla oil, as these are the principal vegetable drying oils of commerce. Instead of using a mixture of castor oil and one of these vegetable drying oils, it is possible to use a mixture of the castor oil with a combination of two or more of these vegetable drying oils. It would be possible to also use, in place of the three vegetable drying oils mentioned, some of the scarcer vegetable drying oils but, ordinarily, commercial considerations and the element of cost would lead to the use of one or more of the three vegetable drying oils mentioned. However, I have found that the best results are obtained by the use of a vegetable drying oil having an iodine value of 160 or above and this classification would include the three vegetable drying oils specifically mentioned.

Having thus described my invention, I claim:

1. The steps of the hereindescribed method which consist in destructively distilling a mixture of castor oil and a vegetable drying oil having an iodine value above 160 until the residue is from seventy to ninety per cent of the original weight of said mixture, and then heating such residue with a polyhydric alcohol.

2. The steps of the hereindescribed method which consist in destructively distilling a mixture of castor oil and a vegetable drying oil having an iodine value above 160 until the residue is from seventy to ninety per cent of the original weight of said mixture, then heating such residue with a polyhydric alcohol, with addition of a member selected from the group consisting of organic polybasic acids or acid anhydrides until condensation takes place and the mass becomes homogeneous, clear and substantially tranquil.

3. The steps of the hereindescribed method which consist in destructively distilling a mixture of castor oil and a vegetable drying oil having an iodine value above 160 until the residue is from seventy to ninety per cent of the original weight of said mixture, and then heating such residue with the addition of glycerine and phthalic anhydride.

4. The steps of the hereindescribed method which consist in destructively distilling a mixture of castor oil and a vegetable drying oil having an iodine value above 160 until the residue is from seventy to ninety per cent of the original weight of said mixture, and then heating such residue with the addition of one-half to three times its weight of glycerine the esterifiable constituents of the residue are substantially esterified.

5. The steps of the hereindescribed method which consist in destructively distilling a mixture of castor oil and a vegetable drying oil having an iodine value above 160 until the residue is from seventy to ninety per cent of the original weight of said mixture, then heating such residue with the addition of one-half to three times its weight of glycerine until the esterifiable constituents of the residue are substantially esterified, and then heating the product thus obtained with from three-fourths to five times its weight of phthalic anhydride until condensation takes place and the mass becomes homogeneous, clear and substantially tranquil.

6. The material produced by the method defined in claim 2.

7. The material produced by the method defined in claim 5.

In testimony whereof, I hereunto affix my signature.

EDWARD C. HOLTON.